United States Patent
Tocher

(10) Patent No.: US 8,358,027 B2
(45) Date of Patent: Jan. 22, 2013

(54) INTEGRALLY RIBBED ROGALLO WING ARRAY

(75) Inventor: Angus J. Tocher, Calgary (CA)

(73) Assignee: Slingshot Wind Energy Systems Inc., Calgary, Alberta (CA)

(*) Notice: Subject to any disclaimer, the term of this patent is extended or adjusted under 35 U.S.C. 154(b) by 1212 days.

(21) Appl. No.: 12/181,095

(22) Filed: Jul. 28, 2008

(65) Prior Publication Data

US 2010/0019099 A1 Jan. 28, 2010

(51) Int. Cl.
*F03D 9/00* (2006.01)
(52) U.S. Cl. .............. 290/55; 290/44; 415/2.1; 415/4.1; 244/153 R; 244/154; 244/45 R
(58) Field of Classification Search .............. 244/153 R, 244/154, 155 A, 123.1, 45 R; 415/2.1, 4.1–4.5, 415/905, 907, 908; 290/44, 55
See application file for complete search history.

(56) References Cited

U.S. PATENT DOCUMENTS

| | | | |
|---|---|---|---|
| 2,546,078 A | 3/1951 | Rogallo et al. | |
| 2,751,172 A | 6/1956 | Rogallo et al. | |
| 3,135,483 A | 6/1964 | Girard | |
| 3,507,464 A * | 4/1970 | Rogallo | 244/218 |
| 4,047,832 A * | 9/1977 | Sforza | 415/1 |
| 4,075,500 A * | 2/1978 | Oman et al. | 290/55 |
| 4,209,148 A | 6/1980 | Lemoigne | |
| 4,659,940 A * | 4/1987 | Shepard | 290/55 |
| 4,684,316 A * | 8/1987 | Karlsson | 415/211.1 |
| 4,832,571 A * | 5/1989 | Carrol | 416/132 B |
| 5,599,172 A * | 2/1997 | McCabe | 417/334 |
| 5,620,153 A | 4/1997 | Ginsberg | |
| 6,523,781 B2 * | 2/2003 | Ragner | 244/153 R |
| 6,887,031 B1 * | 5/2005 | Tocher | 415/1 |
| 7,188,808 B1 * | 3/2007 | Olson | 244/153 R |
| 7,210,896 B2 * | 5/2007 | Knott | 415/4.3 |
| 7,220,096 B2 * | 5/2007 | Tocher | 415/1 |
| 7,275,719 B2 * | 10/2007 | Olson | 244/155 A |
| D608,736 S * | 1/2010 | Brock | D13/115 |
| 7,976,268 B2 * | 7/2011 | Presz et al. | 415/4.3 |
| 7,976,269 B2 * | 7/2011 | Presz et al. | 415/4.3 |
| 7,976,270 B2 * | 7/2011 | Presz et al. | 415/4.3 |

(Continued)

FOREIGN PATENT DOCUMENTS

CA 2188851 4/1997

(Continued)

OTHER PUBLICATIONS

"Rogallo Wing", Wikipedia [online], Dec. 2008, http://en.wikipedia.org/wiki/Rogallo_wing.

*Primary Examiner* — Philip J Bonzell
(74) *Attorney, Agent, or Firm* — Anthony R. Lambert

(57) ABSTRACT

There is a Rogallo wing having an aerodynamic sheet having a leading end and a trailing edge. The trailing edge is curved to form a sheet of increasing concavity away from the leading edge. At least two folded edges extend between the leading end and the trailing edge are on opposed sides of the aerodynamic sheet, the two folded edges comprising integral ribs. A wind energy extraction apparatus comprises one or more concentrator wings that react with a flow of wind to induce a drop in static air pressure that is then used to drive one or more impellers and one or more power converters. The one or more concentrator wings are Rogallo wings.

11 Claims, 9 Drawing Sheets

U.S. PATENT DOCUMENTS

| | | | |
|---|---|---|---|
| 7,980,811 B2 * | 7/2011 | Presz et al. | 415/4.3 |
| 8,021,100 B2 * | 9/2011 | Presz et al. | 415/4.3 |
| 8,061,963 B2 * | 11/2011 | Chen | 415/1 |
| 2002/0040948 A1 * | 4/2002 | Ragner | 244/153 R |
| 2003/0042366 A1 | 3/2003 | Britt et al. | |
| 2005/0207881 A1 * | 9/2005 | Tocher | 415/4.1 |
| 2008/0048453 A1 * | 2/2008 | Amick | 290/44 |
| 2008/0232957 A1 * | 9/2008 | Presz et al. | 415/191 |
| 2009/0087308 A2 * | 4/2009 | Presz et al. | 415/191 |

FOREIGN PATENT DOCUMENTS

| | | |
|---|---|---|
| WO | 2006007696 | 1/2006 |

* cited by examiner

INTEGRALLY RIBBED ROGALLO WING ARRAY

TECHNICAL FIELD

This relates to the technical field of Rogallo wings.

BACKGROUND

A conventional aircraft wing has an upper skin and a lower skin, and is usually made from metal. Due to the two skins, a conventional aircraft wing may be too heavy for certain applications and is more difficult to construct than a wing formed from a single skin. A conventional aircraft wing can be prohibitively expensive and too time consuming to be advantageously used in some applications, such as for example in wind turbines.

A traditional Rogallo wing is formed from a conical single sail-fabric connected between various supporting ribs. The Rogallo wing is the type of wing that was used in early hang gliders and is now most commonly seen in kids' kites. The Rogallo wing is a simpler design than a conventional aircraft wing, but requires more maintenance and has a shorter lifespan than a conventional aircraft wing.

SUMMARY

In an embodiment there is provided a Rogallo wing, comprising an aerodynamic sheet having a leading end and a trailing edge. The trailing edge is curved to form a sheet of increasing concavity away from the leading end. At least two folded edges extend between the leading end and the trailing edge on opposed sides of the aerodynamic sheet, the two folded edges comprise integral ribs.

In an embodiment there is provided a plurality of Rogallo wings, each of the Rogallo wings comprising an aerodynamic sheet having a leading end and a trailing edge. The trailing edge is curved to form a sheet of increasing concavity away from the leading end. At least two folded edges extend between the leading end and the trailing edge on opposed sides of the aerodynamic sheet and the two folded edges comprise integral ribs. The plurality of Rogallo wings form an array of interconnected wings.

In an embodiment, there is provided a wind energy extraction apparatus comprising one or more concentrator wings that react with a flow of wind to induce a drop in static air pressure that is then used to drive one or more impellers and one or more power converters. The one or more concentrator wings comprise Rogallo wings.

In an embodiment there is provided a method of constructing a Rogallo wing, comprising providing a sheet of material. The sheet of material is bent into a Rogallo wing shape having a leading end and a trailing edge. The trailing edge is curved to form a sheet of increasing concavity away from the leading end. The edges of the sheet of material extending between the leading end and the trailing edge on opposed sides of the aerodynamic sheet are folded to form integral ribs.

In all of the embodiments incorporating a Rogallo wing with a leading end, the leading end may be, for example, a leading edge.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
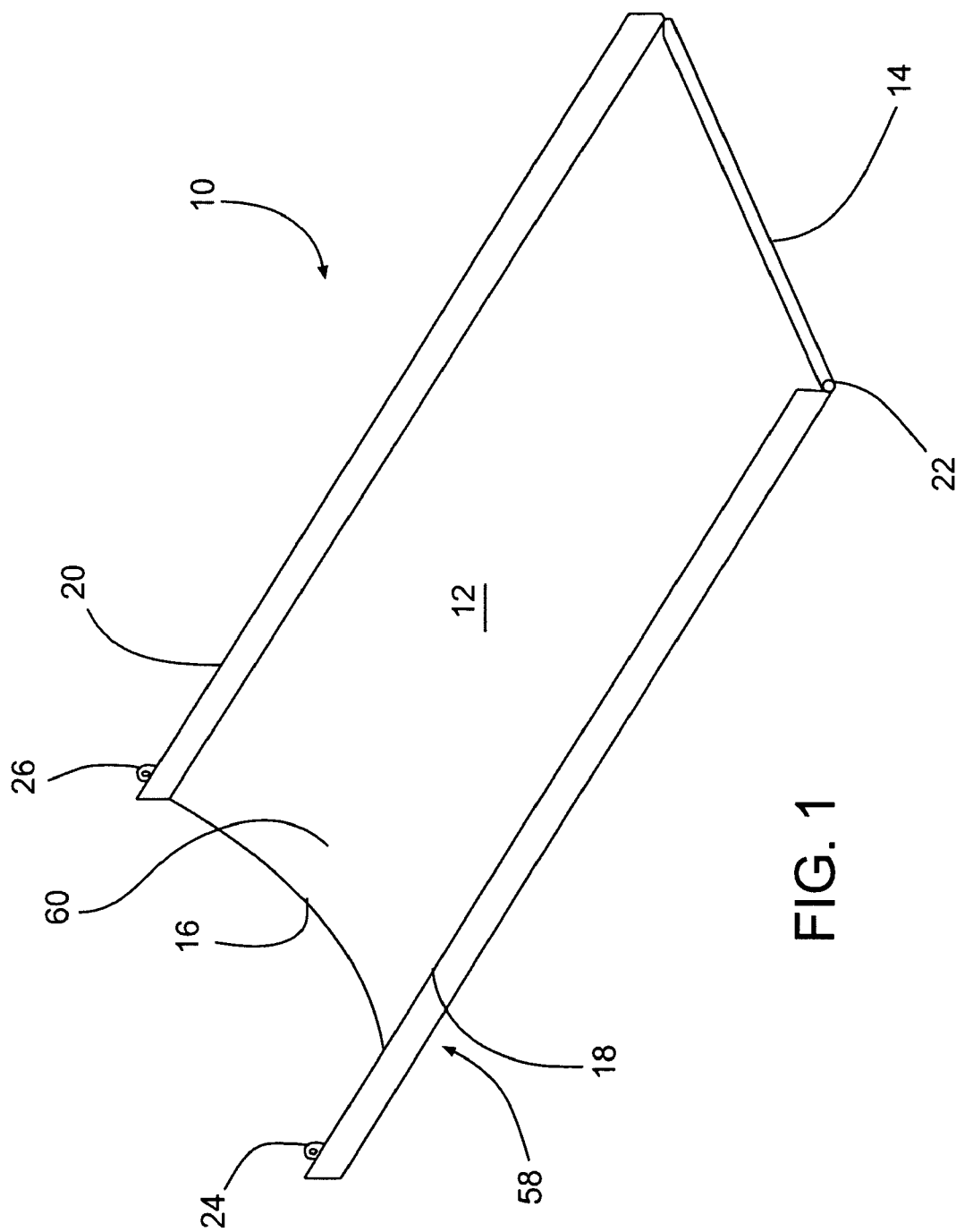
FIG. 1 is a perspective view of a Rogallo wing with folded edges.
Figure 2:
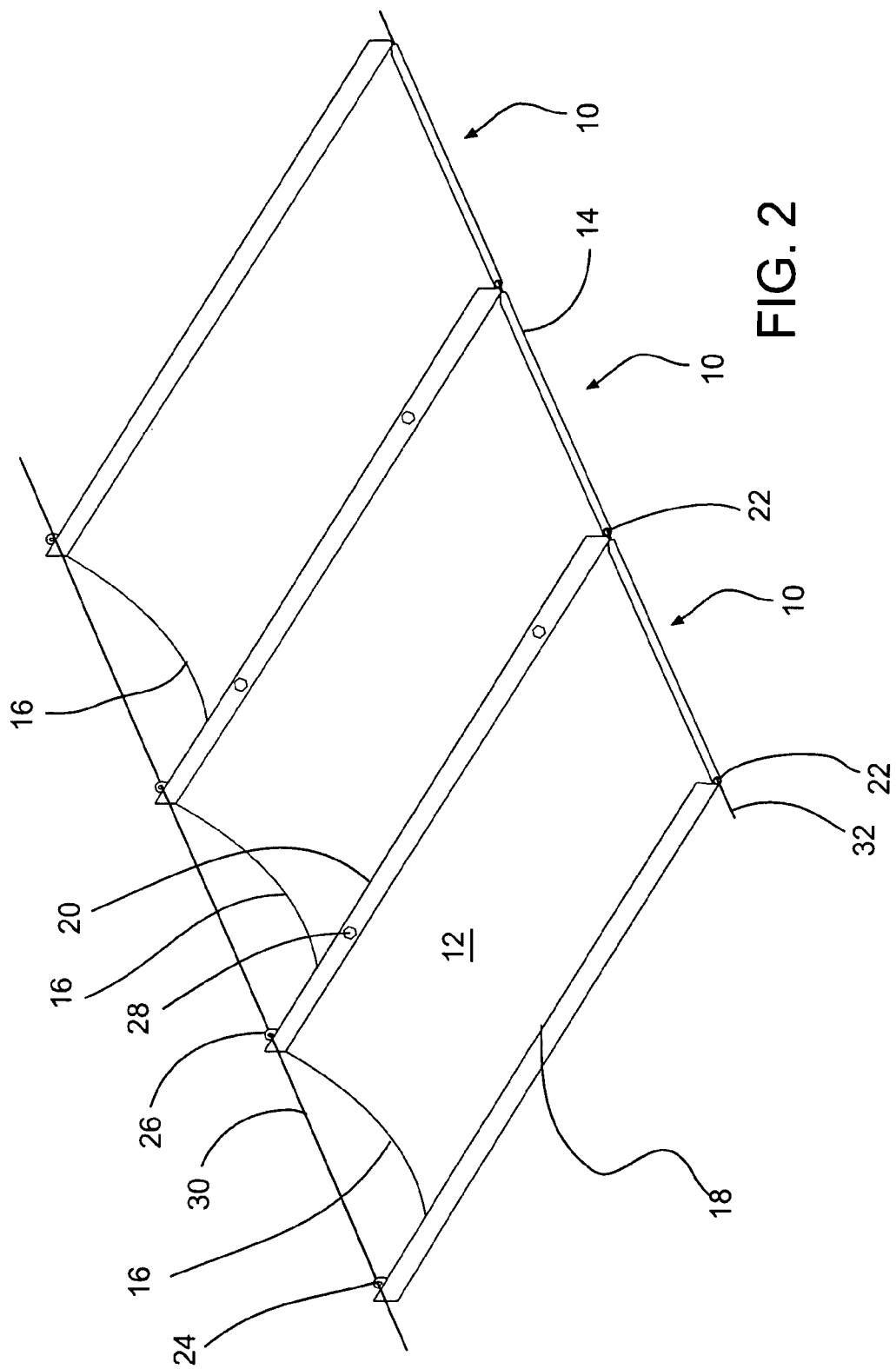
FIG. 2 is a perspective view of an array of Rogallo wings with folded edges.
Figure 3:
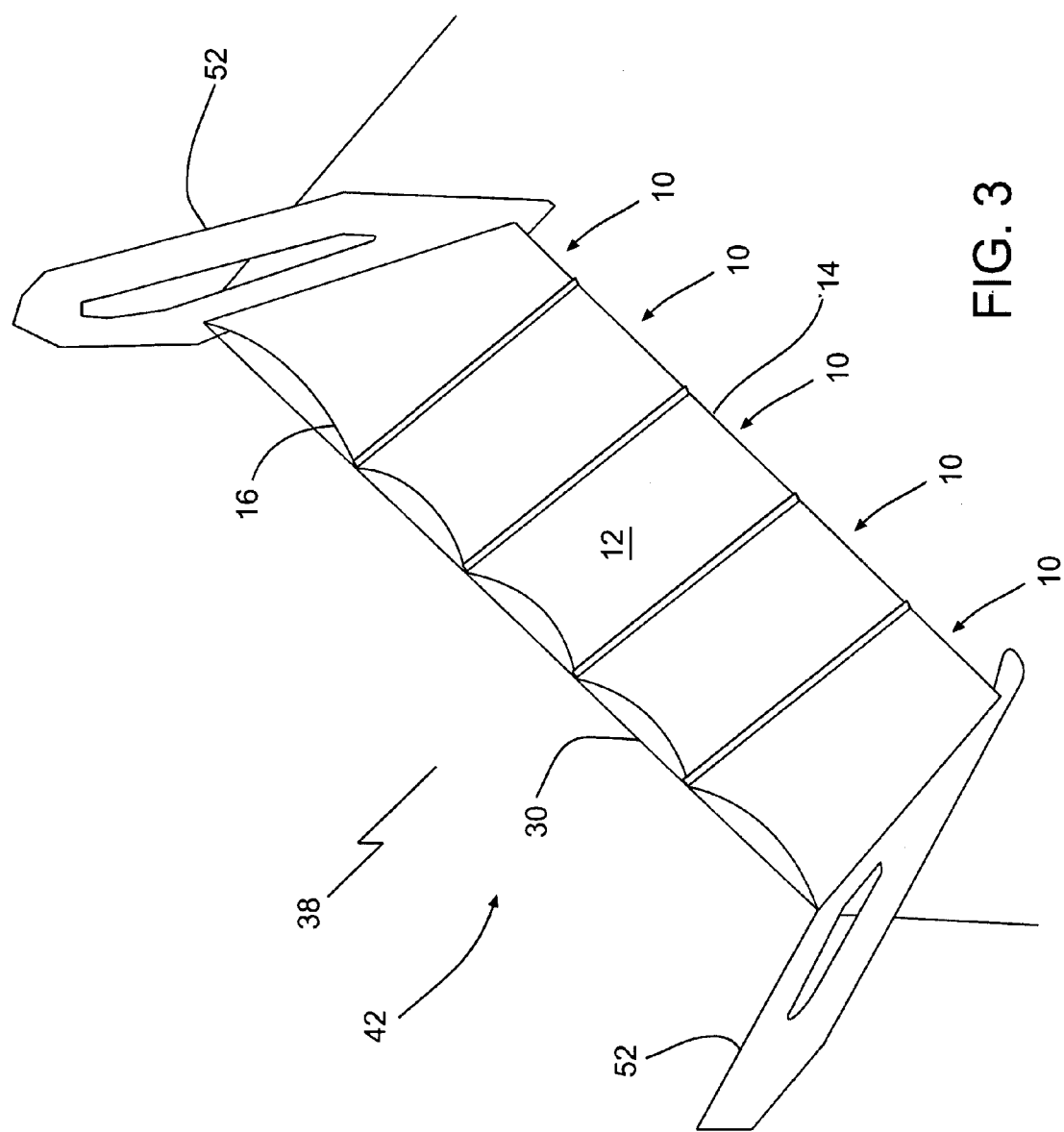
FIG. 3 is a perspective view of an array of Rogallo wings supported between two support fins.

FIGS. 1-3 show Rogallo wings 10. Referring to FIG. 1, the Rogallo wing 10 has an aerodynamic sheet 12 that has a leading end 14 and a trailing edge 16. The leading end 14 may be for example, as shown in FIG. 1, a leading edge, which may be flat for example. In other embodiments, the leading end may be a point. In some embodiments, the leading end 14 has a shorter length than the trailing end 16. The trailing edge 16 is curved to form a sheet of increasing concavity away from the leading edge 14. The concavity may be increased for example gradually, or in steps or other suitable configurations. At least two folded edges 18, 20 extend between the leading edge 14 and the trailing edge 16 on opposed sides of the aerodynamic sheet 12. The two folded edges 18, 20 act as integral ribs of the Rogallo wing 10. In the embodiment shown in FIG. 1, the Rogallo wing has a pan shape, in which the wing has a leading edge 14 that is not curved and a trailing edge 16 that is curved. In some embodiments, curved may mean, for example, stepped, bent, or any type of concave shape. The integral ribs 18, 20 effectively form external ribs of the Rogallo wing. The integral ribs help prevent the structure of the wings from bending when air pressure, such as wind, is applied against the wings. The increasing concavity between the leading edge 14 and the trailing edge 16 also imparts significant strength to the wing panel. The combination of the increasing concavity and the integral ribs together give the required strength to the wing panel to prevent the force of the wind from permanently deforming the external ribs of the wing panels in a storm or very strong wind. The type, strength and thickness of the material used also have an effect on the strength of the wing panel.

As shown in FIG. 2, the Rogallo wing 10 may have a hollow end 22 at the leading edge 14 of the aerodynamic sheet 12. Hollow end 22 may extend at least partially along the leading edge 14. Hollow end 22 may be formed by, for example, at least one ring or eyelet on leading edge 14. The rings or eyelets may be aligned, for example. In some embodiments, a loop may be attached to each of the two folded edges 18, 20. Loops 24, 26 lie on the folded edges 18, 20 adjacent to the trailing edge 16 of the aerodynamic sheet 12. A wire may be connected through the loops 24, 26 on each of the folded edges. The wire may be, for example a first supporting cable 30 that supports the trailing edge 16 of the aerodynamic sheet by passing through the loops 24, 26. In some embodiments, a wire is disposed through the hollow ends 22 of each of the leading edges 14 of the array of interconnected wings 10. The wire may be, for example, a second supporting cable 32, second supporting cable 32 extending through the hollow ends 22 of the leading edge 14 of the Rogallo wings 10. Adjacent folded edges of adjacent wings may be connected together, by for example rivets 28 that connect the folded edge 20 of one Rogallo wing 10 with the folded edge 18 of an adjacent Rogallo wing.

As shown in FIG. 3, support fins 52 are used to support an array 38 of interconnected Rogallo wings 10. Each of the arrays 38 of Rogallo wings may be supported by cables between supporting fins 52. The cables may further comprise at least first supporting cable 30 and second supporting cable 32, the Rogallo wings being supported between first supporting cable 30 and second supporting cable 32 (FIG. 2).

Figure 4:
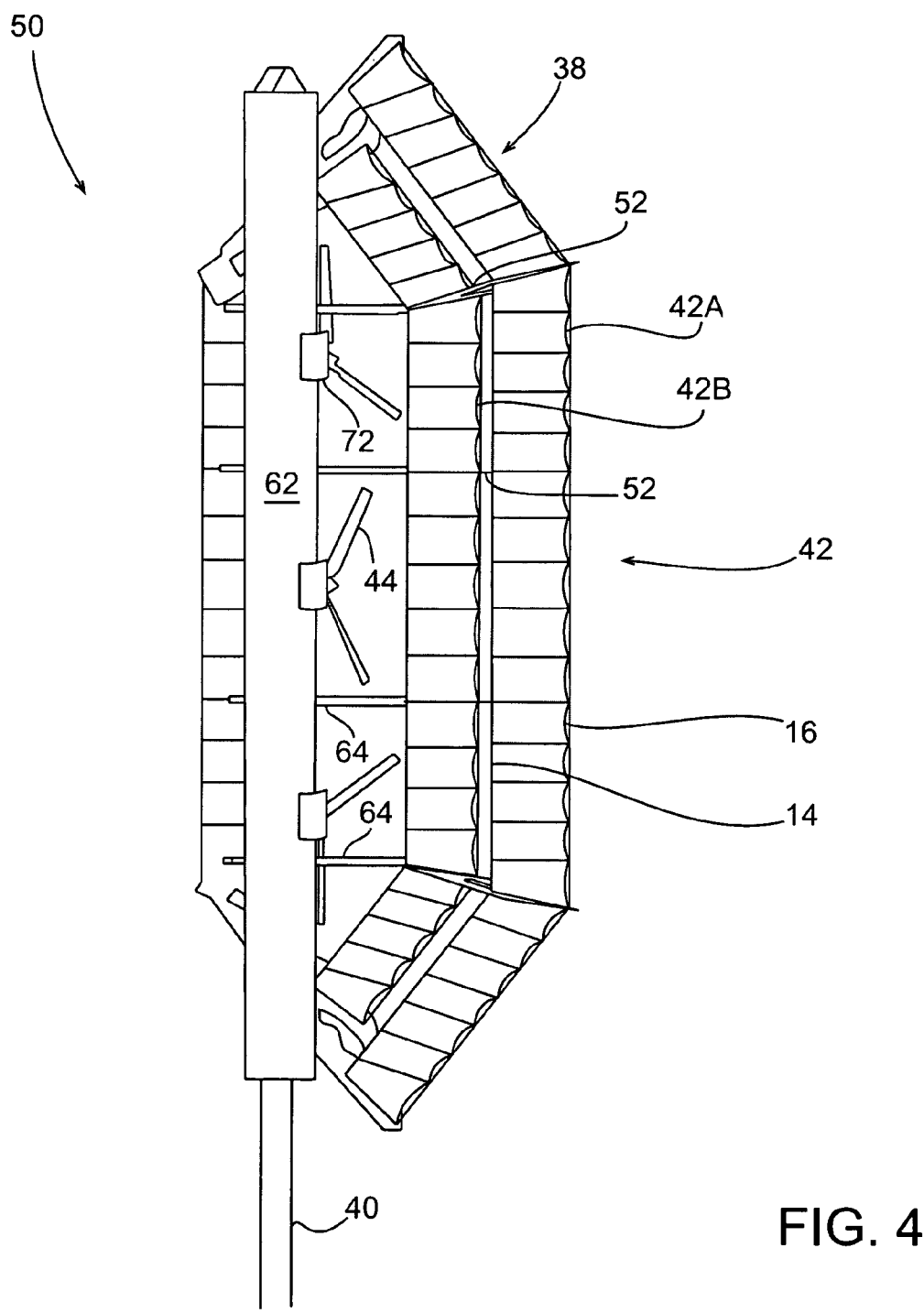
FIG. 4 is a perspective view of a plurality of Rogallo wings on a wind turbine.
Figure 5:
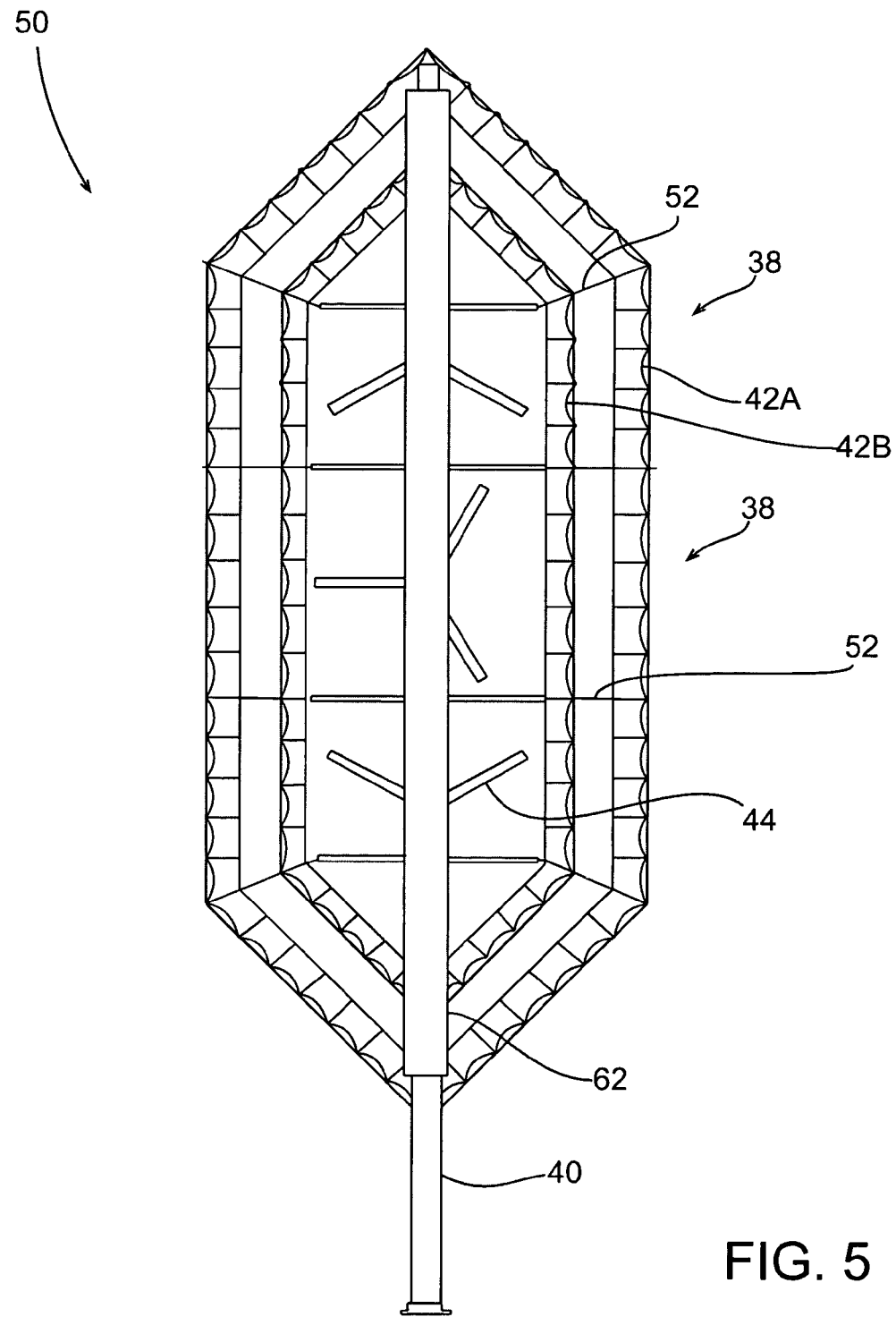
FIG. 5 is a end elevation view of a plurality of Rogallo wings on a wind turbine.

In FIGS. 4-9, the Rogallo wings are shown in operation with a turbine 50. In such embodiments, a plurality of Rogallo wings may form the wing members of turbine 50. In FIG. 4, the embodiment illustrated shows a wind energy extraction apparatus comprising one or more concentrator wings 42. The concentrator wings 42 comprise Rogallo wings and react with a flow of wind to induce a drop in static air pressure that is then used to drive one or more impellers 44 and one or more power converters 72 shown encased in housing and connected to the one or more impellers 44. Arrays 38 of Rogallo wings are supported on support fins 52 connected to a fuselage 62. The fuselage 62 is supported on a support pole 40. Each array 38 of Rogallo wings 10 (FIG. 3) acts as a concentrator wing 42.

Figure 6:
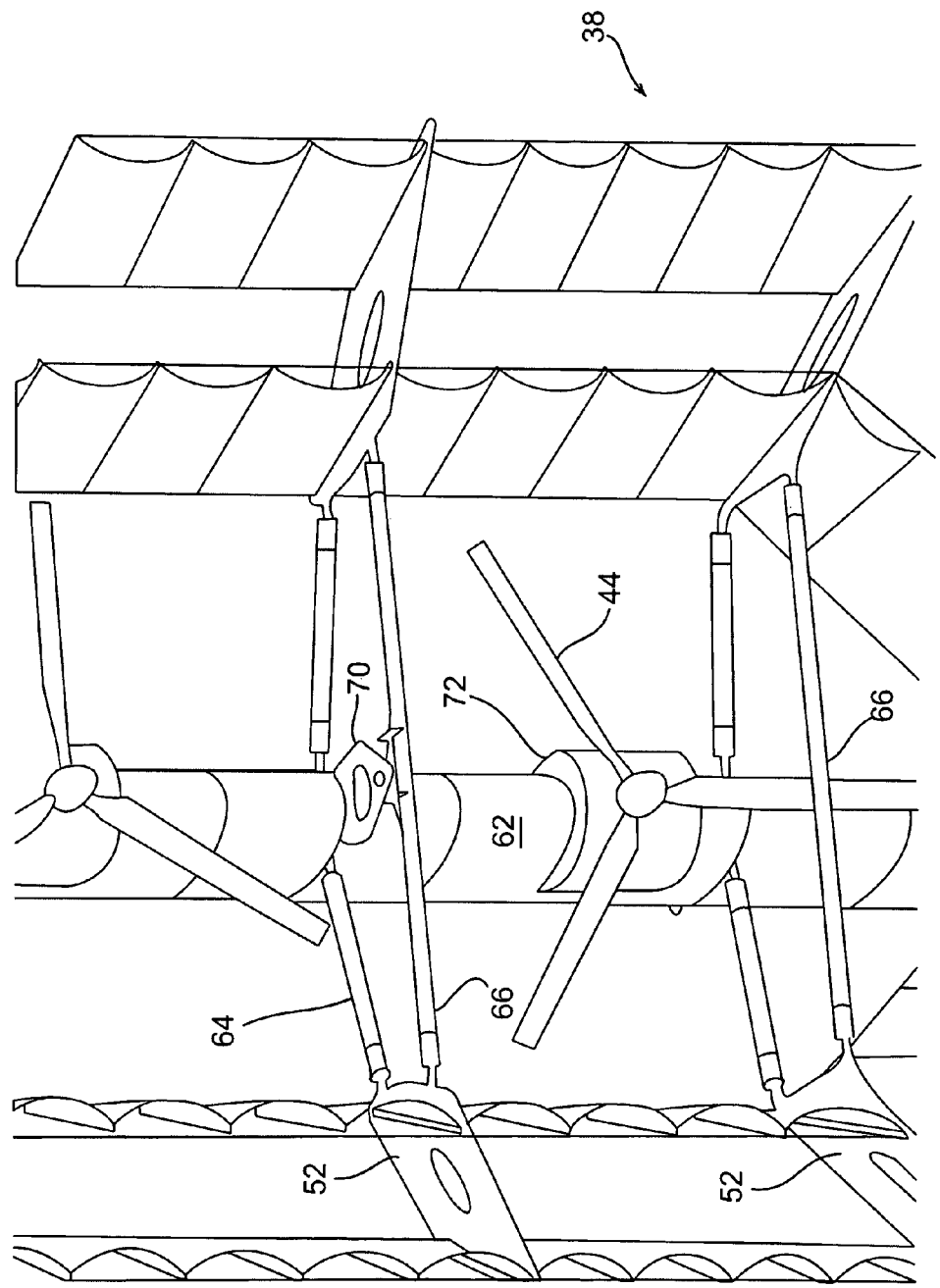
FIG. 6 is a partial perspective view of a plurality of Rogallo wings on a wind turbine.
Figure 7:
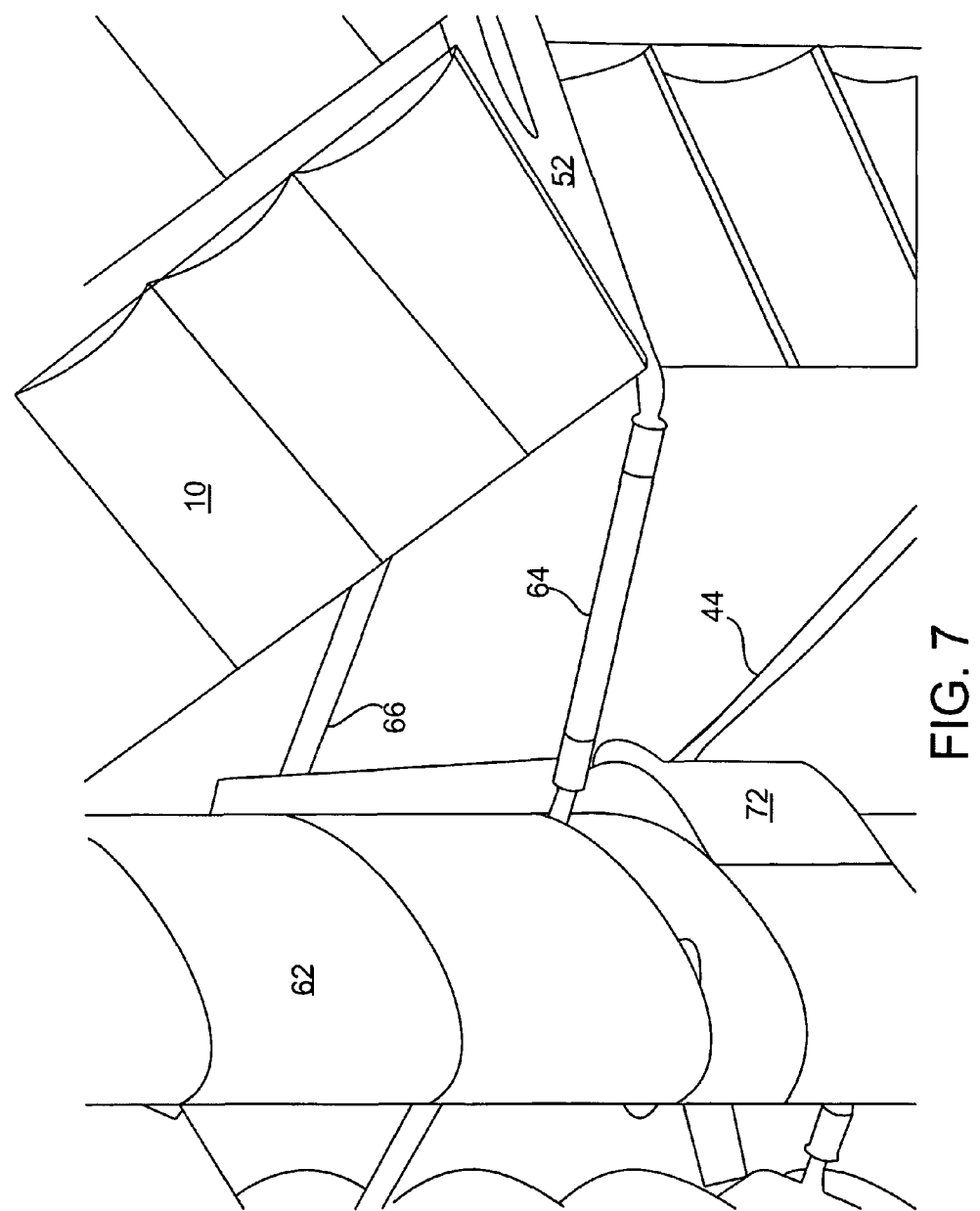
FIG. 7 is a partial perspective view of a brace supporting a plurality of Rogallo wings on a wind turbine.
Figure 8:
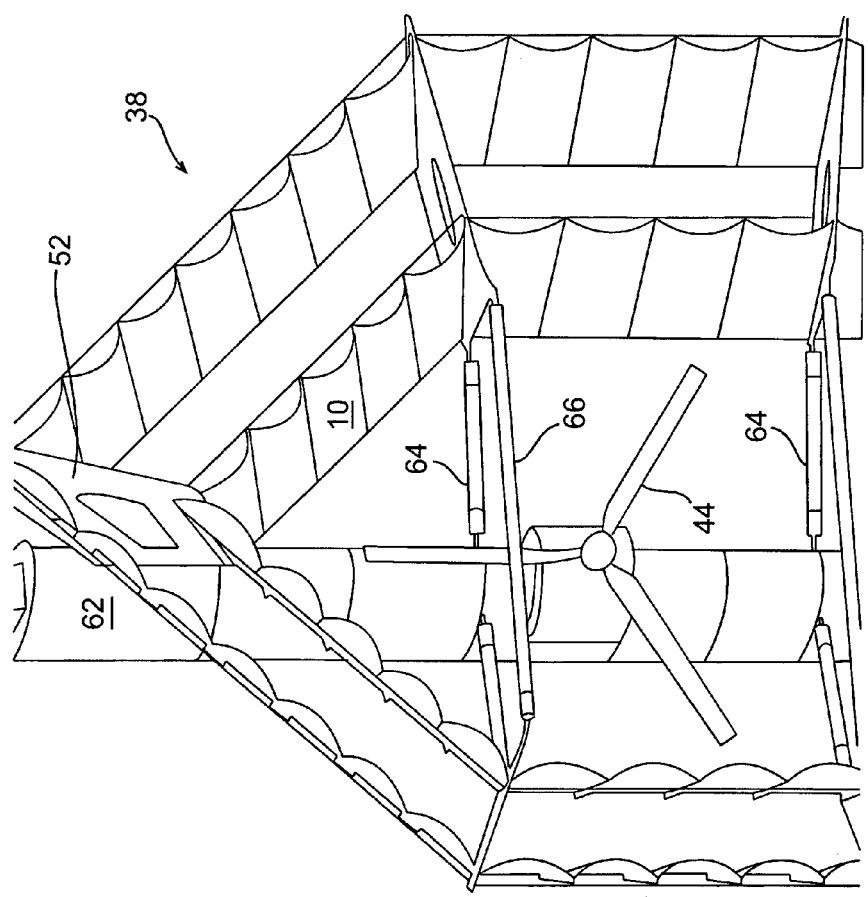
FIG. 8 is a partial perspective view of braces and an impellor on a wind turbine with Rogallo wings.
Figure 9:
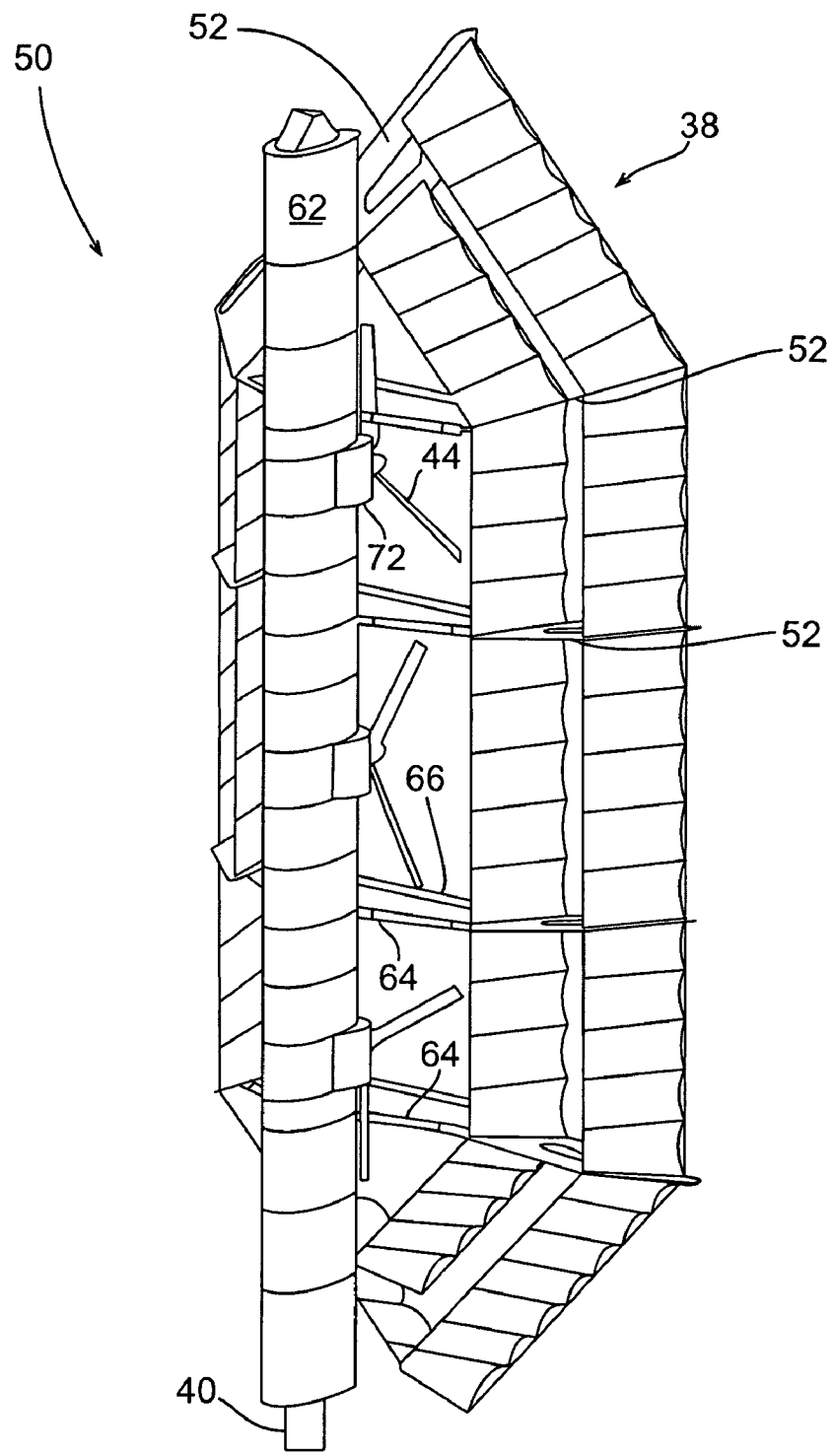
FIG. 9 is a side perspective view of a plurality of Rogallo wings on a wind turbine.

In FIG. 6 braces 64, 66 are shown supporting the support fins 52. Braces 64 connect the support fins 52 to the fuselage 62. Braces 66 connect between support fins 52 lying on opposed sides of the fuselage 62. A supporting brace 70 may connect the brace 66 to the fuselage 62 for additional support. FIG. 7 shows a corner support fin 52 supported by braces 62, 64. FIG. 8 shows a support fin 52 connected directly to the top of the fuselage 62. Although one example of a support structure comprising support fins and braces is described here, various different support structures may be used to support the concentrator wings 42.

The Rogallo wings 10 (FIG. 1) may be made, for example, from aluminum sheeting with one material thickness. In the embodiments shown, the Rogallo wings have no internal ribs. The aerodynamic shape of the wing is created by having a relatively flat leading edge, developing into a pronounced bow shape at the trailing edge of the wing. The aerodynamic sheet replicates the curvature of a conventional wing, but instead uses only one sheet of material. To a point, increasing the degree of bow in the trailing edge of a Rogallo type wing is equivalent to increasing the curvature of a conventional wing.

The Rogallo wings 10 may be constructed from a single flat sheet of material. The material may be curved into a Rogallo wing shape and then have the edges folded and bent to create an integral or external rib. The combination of the external rib and the natural cupped shape of the Rogallo wing, when made from a solid sheet material such as aluminum, provide a strong, lightweight and inexpensive structure. As shown in FIG. 2, the leading and trailing edges 14, 16 may be supported by cables 30, 32. In other embodiments, stiff members such as rods or pipes may be used to support the Rogallo wings. Other materials other than aluminum may be used to construct the aerodynamic sheets 12. A variety of materials may be used to form the aerodynamic sheets, although factors such as the cost of tooling the materials and level of degradation of the materials due to sun exposure may be considered when choosing a new design, depending on budgetary concerns and whether the wings are to be used in an indoor or outdoor setting. Metals, composites, fiberglass materials and synthetics are examples of types of materials that may be used to form the aerodynamic sheets. Stiff materials are preferable due to their longer life-span and reduced maintenance.

The arrays 38 (FIG. 4) of Rogallo wings 10 may be installed as a group, using two cables 30, 32 (FIG. 2), one running at the leading edge 14 and one at the trailing edge 16. The wing may then be installed between two rigid structures, such as the support fins 52 shown in FIG. 4. As long as the cables are tensioned, a full wing is created which does not require internal spars. The use of cables adds to the flexibility of the wings, so that the wings can flex to a degree without damaging the individual Rogallo wing panels. The Rogallo wings have the advantages and simplicity of sailcloth wings but also may be made using durable materials, such as aluminum, to give long life and good durability. The integrals ribs give the aerodynamic sheet structure and form, which allow the wings to be made without internal ribs. In some embodiments internal ribs may be used to give additional support.

The adjacent folded edges of adjacent Rogallo wings may be connected by means other than rivets 28 shown in FIG. 2. In some embodiments, cables alone may join the individual Rogallo wings together without additional supporting structures. In other embodiments, the adjacent folded edges of the Rogallo wings may be connected by other means such as bolts and screws, or the folded edges may be welded together.

Referring to FIG. 4, for completeness of disclosure, a description of how a wind turbine 50 having one or more concentrator wings 42 operates follows. Concentrator wings 42 operate fundamentally the same as aircraft wings. The concentrator wings 42 are arrays 38 of Rogallo wings 10. Referring to FIG. 1, each of the Rogallo wings 10 have a first surface 58 that is convex shaped at the trailing edge 16 to accelerate the flow of wind, and a corresponding second surface 60 that is concave shaped on the opposite side of the aerodynamic sheet at the trailing edge 16 that tends to slightly decelerate the flow of wind past the second surface 60. Referring to FIG. 4, first and second concentrator wings 42A and 42B may operate in series to enhance the pressure differential effect created as wind travels over surfaces 58 and 60 (FIG. 1). In order to accomplish this effect, first and second concentrator wings 42A and 42B may be staggered, for example. First concentrator wing 42A induces a lower static pressure region over the first surfaces 58 of the wing that in turn causes an acceleration of the wind flow past the second surfaces 60 of an adjacent second concentrator wing 42B. This in turn causes an increased acceleration of the flow of wind over the first surfaces 58 of the second concentrator wing 42B. In a wind turbine 50, the accelerated flow is used to increase the static pressure differential occurring between opposed sides of the impellers 44. The static pressure gradient between the opposed sides of the impellor 44 causes the wind to be focused more powerfully to drive impellers 44 and power converters 72.

The Rogallo wing arrays may be used in different turbine designs. In some embodiments, a turbine may have a single drive impellor 44 connected to a single power converter 72. In some embodiments, a single row of concentrator wings 42 may draw wind across the impellers 44. Also, in some embodiments, the turbine 50 may be connected directly to a power utility pole and be arranged so that power is provided to the utility power.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A wind energy extraction apparatus comprising:
   one or more impellors;
   one or more power converters;
   one or more concentrator wings supported in relation to the one or more impellors and one or more power converters to react with a flow of wind in use to induce a drop in static air pressure that is then used to drive the one or more impellors and the one or more power converters, the one or more concentrator wings comprising Rogallo wings;
   each Rogallo wing being formed of an aerodynamic sheet having a leading edge and a trailing edge, the trailing edge being curved to form a sheet of increasing concavity away from the leading edge;
   each Rogallo wing including bent edges extending between the leading edge and the trailing edge on opposed sides of the aerodynamic sheet, the bent edges comprising integral ribs; and
   adjacent Rogallo wings being connected together along respective ones of the bent edges to form an array of Rogallo wings.

2. The wind energy extraction apparatus of claim 1 in which the respective ones of the bent edges of adjacent Rogallo wings are riveted together.

3. The wind energy extraction apparatus of claim 1 in which each array of Rogallo to wings is a linear array.

4. The wind energy extraction apparatus of claim 1 in which the one or more concentrator wings comprise at least two concentrator wings, each concentrator wing being a linear array of Rogallo wings, and being disposed on opposed sides of the one or more impellors.

5. The wind energy extraction apparatus of claim 1 in which each of the arrays of Rogallo wings is supported by cables between supporting fins.

6. The wind energy extraction apparatus of claim 5 in which the cables further comprise at least a first supporting cable and a second supporting cable, the first supporting cable being, disposed through a hollow end on each of the leading edges of the array of interconnected Rogallo wings and the second supporting cable being disposed through a loop on each of the two folded edges.

7. The wind energy extraction apparatus of claim 1 in which the aerodynamic sheet of each Rogallo wing comprises a metal sheet.

8. The wind energy extraction apparatus of claim 7 in which the metal sheet of each Rogallo wing comprises an aluminum sheet.

9. A wind energy extraction apparatus comprising:
   one or more impellers;
   one or more power converters;
   one or more concentrator wings supported in relation to the one or more impellors and one or more power converters to react with a flow of wind in use to induce a drop in static air pressure that is then used to drive the one or more impellors and the one or more power converters, the one or more concentrator wings each comprising an array of Rogallo wings;
   each Rogallo wing of the array of Rogallo wings being formed of an aerodynamic sheet having a leading edge and a trailing edge, the trailing edge being curved to form a sheet of increasing concavity away from the leading edge;
   each Rogallo wing of the array of Rogallo wings including side edges extending between the leading edge and the trailing edge on opposed sides of the aerodynamic sheet; and
   adjacent Rogallo wings in each array of Rogallo wings being connected together along respective ones of the side edges to form a linear array of Rogallo wings.

10. The wind energy extraction apparatus of claim 9 in which there are two or more impellors and two or more power converters, and the one or more concentrator wings react with a flow of wind in use to induce a drop in static air pressure that is then used to drive the two or more impellors and the two or more power converters.

11. The wind energy extraction apparatus of claim 10 in which the one or more concentrator wings comprise at least two concentrator wings, each concentrator wing being a linear array of Rogallo wings and being disposed on opposed sides of the two or more impellors.

* * * * *